United States Patent
Yoshida (10) Patent No.: US 11,454,293 B2
(45) Date of Patent: Sep. 27, 2022

(54) DIAPHRAGM TRANSFER DEVICE AND METHOD FOR MANUFACTURING LIQUID-FILLED VIBRATION ISOLATION MOUNT

(71) Applicant: TOYO TIRE CORPORATION, Itami (JP)

(72) Inventor: Hiroyuki Yoshida, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 411 days.

(21) Appl. No.: 16/689,533

(22) Filed: Nov. 20, 2019

(65) Prior Publication Data

US 2020/0166098 A1     May 28, 2020

(30) Foreign Application Priority Data

Nov. 22, 2018    (JP) .............................. JP2018-219385

(51) Int. Cl.
     *F16F 9/10*         (2006.01)
     *F16F 13/10*       (2006.01)
     *F16F 9/32*        (2006.01)

(52) U.S. Cl.
     CPC .......... *F16F 13/103* (2013.01); *F16F 9/3271* (2013.01); *F16F 13/102* (2013.01); *F16F 2226/04* (2013.01)

(58) Field of Classification Search
     CPC ...... F16F 13/103; F16F 9/3271; F16F 13/102; F16F 2226/04; B25J 15/0683; B25J 19/00; B25J 19/0025
     See application file for complete search history.

(56) References Cited

U.S. PATENT DOCUMENTS

2019/0145487 A1*   5/2019   Oyaizu ................ B60K 5/1208
                                                                                                                                                                29/897.2

FOREIGN PATENT DOCUMENTS

| JP | 11159566 A | * | 6/1999 | |
|---|---|---|---|---|
| JP | 2003-329079 A | | 11/2003 | |
| JP | 2020093377 A | * | 6/2020 | ............. B23P 19/00 |

* cited by examiner

*Primary Examiner* — Jun S Yoo
(74) *Attorney, Agent, or Firm* — WHDA, LLP (57) ABSTRACT

A diaphragm transfer device sucks and transfers a diaphragm that includes a first protrusion protruding in a direction perpendicular to the surface of the diaphragm. The diaphragm transfer device is provided with: a placing table on which the diaphragm is placed in such an orientation that the first protrusion faces downward; and a suction pad that sucks the diaphragm, placed on the placing table, from above on the outer circumferential side of the protrusion. The placing table includes an annular pedestal facing an outer-circumferential-side thick portion of the diaphragm, the thick portion being sucked by the suction pad, and a second recess recessed downward on the inner diameter side of the pedestal. The whole first protrusion of the diaphragm is located inside the second recess in a top view.

5 Claims, 7 Drawing Sheets

DIAPHRAGM TRANSFER DEVICE AND METHOD FOR MANUFACTURING LIQUID-FILLED VIBRATION ISOLATION MOUNT

CROSS-REFERENCE TO RELATED APPLICATIONS

This application claims priority of Japanese Patent Application No.: 2018-219385 filed on Nov. 22, 2018, the content of which is incorporated herein by reference.

BACKGROUND OF THE INVENTION

Technical Field

The present invention relates to a diaphragm transfer device and a method for manufacturing a liquid-filled vibration isolation mount.

Related Art

As shown in JP2003-329079, a liquid-filled vibration isolation mount (e.g., liquid-filled engine mount, etc.) is manufactured as follows: a liquid is put into a liquid chamber formed in a rubber member, and a diaphragm is then assembled to an opening of the liquid chamber to fill the liquid chamber with the liquid. The diaphragm is placed on a placing table and then sucked and transferred by a diaphragm transfer device, to be assembled to the rubber member.

SUMMARY

Figure 6A:
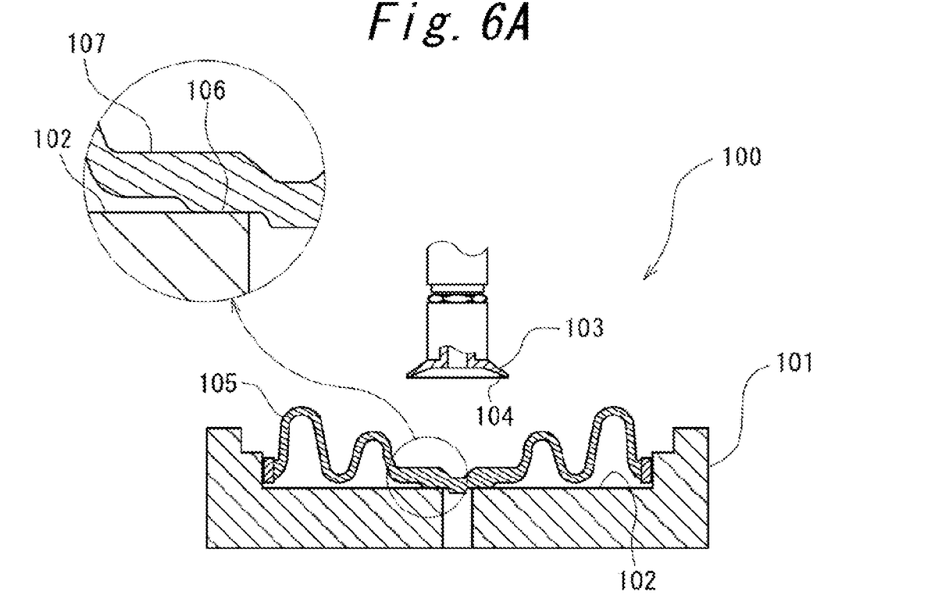
FIGS. 6A and 6B is a diagram showing a state in which a diaphragm is sucked by a suction pad according to a conventional example.

As shown in FIG. 6A, according to a conventional diaphragm transfer device 100, a diaphragm 105 includes in a center a protrusion 106 protruding in a direction perpendicular to the surface of the diaphragm 105, and the diaphragm 105 is placed on a placing table 101 in such an orientation that the protrusion 106 faces downward. The diaphragm 105 is supported from below by the placing table 101 at the protrusion 106 while being placed on the placing table 101, and a sucked portion 107 on the outer circumferential side of the protrusion 106 is sucked from above by a suction pad 103.

The suction pad 103 has a suction surface 104 at the lower end and presses the suction surface 104 against the sucked portion 107 of the diaphragm 105 from above to suck the diaphragm 105 with a negative pressure. In the placing table 101, a placement surface 102 on which the diaphragm 105 is placed is configured in a planar shape. Thus, with the diaphragm 105 placed on the placing table 101, the protrusion 106 is supported on the placement surface 102, while the sucked portion 107 on the outer circumferential side is spaced upward from the placement surface 102.

Figure 6B:
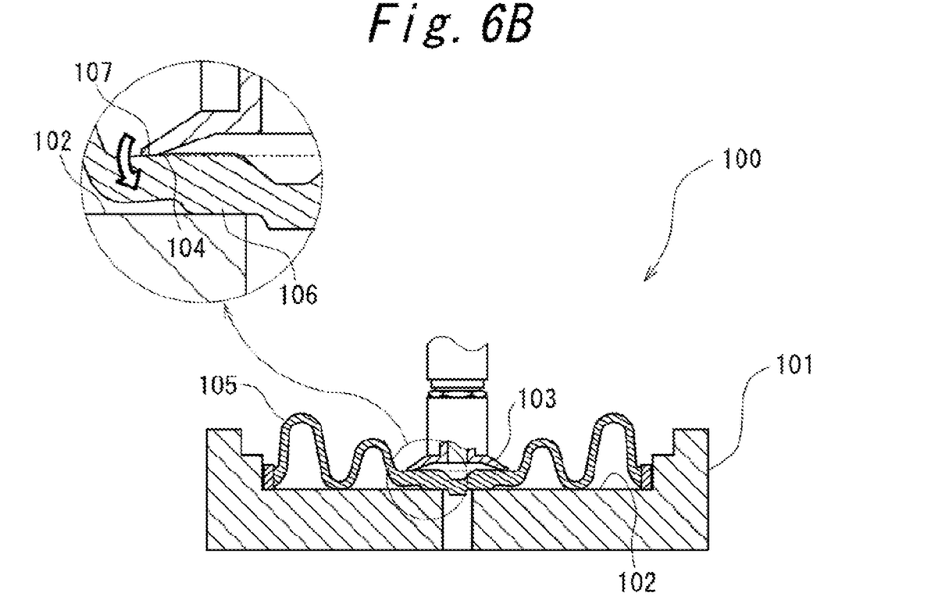

As shown in FIG. 6B, when the suction surface 104 of the suction pad 103 is pressed against the sucked portion 107 of the diaphragm 105 from above in this state, the sucked portion 107 is deformed to be inclined downward with respect to the protrusion 106 on the inside, as indicated by an outline arrow in FIG. 6B. As a result, during suction, the suction surface 104 of the suction pad 103 hardly fits along the sucked portion 107 of the diaphragm 105, and suction failure is likely to occur.

It is an object of the present invention to provide a diaphragm transfer device that can improve a diaphragm sucking property during suction and transfer of the diaphragm placed in such an orientation that a protrusion faces downward, the protrusion protruding in a direction perpendicular to the surface of the diaphragm. It is another object of the present invention to provide a method for manufacturing a liquid-filled vibration isolation mount by sucking and transferring a diaphragm using the diaphragm transfer device and assembling the diaphragm to a rubber member.

The present invention provides a diaphragm transfer device for sucking and transferring a diaphragm that includes a protrusion protruding in a direction perpendicular to a surface of the diaphragm, the diaphragm transfer device including: a placing table on which a diaphragm is placed in such an orientation that the protrusion faces downward; and a suction pad that sucks the diaphragm placed on the placing table, from above on an outer circumferential side of the protrusion. The placing table includes a pedestal having an annular shape and facing a sucked portion of the diaphragm, the sucked portion being sucked by the suction pad, and a recess recessed downward on an inner diameter side of the pedestal, and a whole of the protrusion of the diaphragm is located inside the recess in a top view.

According to the present invention, even when the diaphragm is pressed downward by the suction pad during suction, since the protrusion is located inside the recess, the protrusion is prevented from contacting the placing table before the sucked portion is seated on the pedestal. This leads to reduction in downward deformation of the diaphragm in an inclined manner on the outer circumferential side of the protrusion during suction. As a result, the suction surface of the suction pad easily fits along the diaphragm, and the diaphragm sucking property is improved.

Preferably, in a state where the diaphragm is placed on the placing table and not sucked by the suction pad, the diaphragm vertically faces the pedestal via a first gap.

With this configuration, in the state where the diaphragm is placed on the placing table, interference with the pedestal is prevented even when the dimensional variations of the diaphragm are taken into consideration. This reduces the deformation of the diaphragm during placement, thus improving the property of sucking the diaphragm by the suction pad.

Preferably, in the state where the diaphragm is placed on the placing table and not sucked by the suction pad, the protrusion vertically faces the recess via a second gap, and a length of the first gap is equal to or less than a length of the second gap.

With this configuration, when the diaphragm is pressed downward by the suction pad during suction, the sucked portion is seated on the pedestal before the protrusion bottoms in the recess. This reduces the deformation of the sucked portion of the diaphragm during suction, thus improving the property of sucking the diaphragm by the suction pad.

Preferably, the placing table further includes a step having an annular shape. The step has an outer circumferential wall that positions an outer circumference of the diaphragm radially from an outer diameter side and a bottom surface that supports the outer circumference of the diaphragm from below.

With this configuration, the diaphragm is radially positioned on the outer circumference by the step of the placing table and is also supported from below. Thereby, the diaphragm can be placed on the placing table while being prevented from contacting the pedestal, so that the deformation of the diaphragm during placement is reduced. This improves the property of sucking the diaphragm by the suction pad.

Preferably, the placing table is formed with a groove that radially penetrates the step, and in a state where the diaphragm is positioned on the placing table, a space defined between the diaphragm and the placing table below the diaphragm communicates with an outside of the space through the groove.

This configuration prevents a substantially sealed space from being formed between the diaphragm placed on the placing table and the placing table. Thus, the diaphragm can be easily lifted from the placing table, and the diaphragm sucking property by the suction pad is improved.

Another aspect of the present invention provides a method for manufacturing a liquid-filled vibration isolation mount, the method including: preparing a rubber member in which a liquid chamber is formed, and a diaphragm that includes a protrusion protruding in a direction perpendicular to a surface of the diaphragm and seals the liquid chamber of the rubber member; putting a liquid into the liquid chamber of the rubber member; sucking and transmitting the diaphragm to the rubber member by using the diaphragm transfer device described above; and assembling the diaphragm to the rubber member to fill the liquid chamber with the liquid.

According to the present invention, it is possible to improve the diaphragm sucking property during suction and transfer of the diaphragm placed in such an orientation that a protrusion faces downward, the protrusion protruding in a direction perpendicular to the surface of the diaphragm.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

An embodiment according to the present invention will be described below with reference to the accompanying drawings. Note that the following description is only essentially illustration and does not intend to restrict the invention, its application, or its use. Further, the drawings are schematic, and the ratio of each dimension is different from the actual one.

Figure 1:
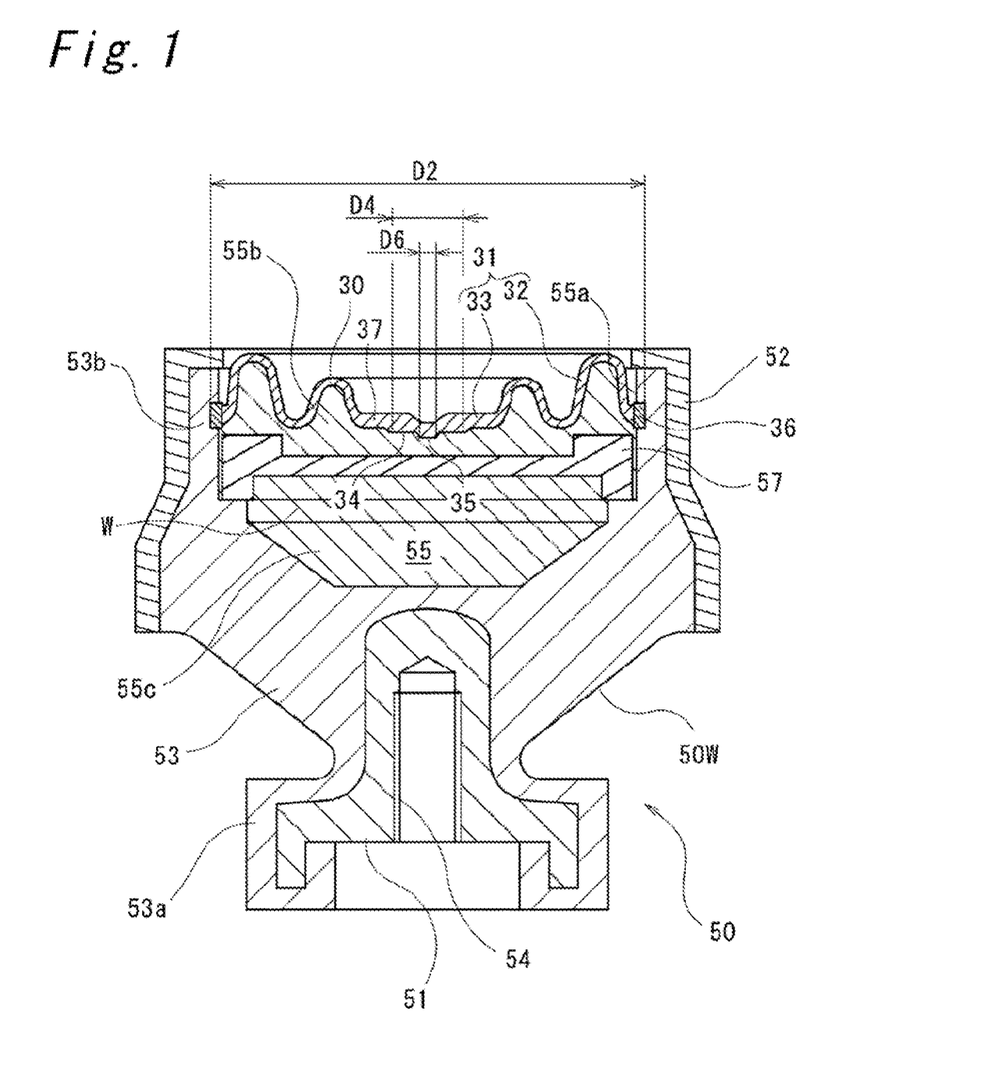
FIG. 1 is a cross-sectional view showing a liquid-filled engine mount rubber.

FIG. 1 shows a liquid-filled engine mount rubber 50 (hereinafter referred to as a liquid-filled mount rubber 50) as an example of a liquid-filled vibration isolation mount. The liquid-filled mount rubber 50 is interposed between an engine (not shown) and a body frame (not shown) to elastically support the engine with respect to the body frame. The liquid-filled mount rubber 50 includes a boss fitting 51 that is attached to the engine, an outer cylindrical fitting 52 that is attached to the body frame, and an elastic base 53 made of a rubber member interposed between the boss fitting 51 and the outer cylindrical fitting 52.

The boss fitting 51 is provided with a vertically extending female thread 54 and is configured to be attached to a member on the engine side at the female thread 54 with a bolt (not shown).

In the elastic base 53, the boss fitting 51 is vulcanized and bonded to a lower end 53a, and the outer cylindrical fitting 52 is fixed to an upper end 53b by caulking. The upper end 53b has an outer diameter larger than that of the lower end 53a, and a liquid chamber 55 opened upward is defined inside the upper end 53b. A diaphragm 30 is provided in the opening 55a at the upper end of the liquid chamber 55.

The liquid chamber 55 is configured in a sealed state by the diaphragm 30 and is filled with a liquid such as water, ethylene glycol, or silicon oil. The liquid chamber 55 is vertically partitioned by a partition member 57 into a first chamber 55b on the upper side and a second chamber 55c on the lower side, and these chambers communicate with each other through an orifice flow channel (not shown) formed in the partition member 57. That is, it is configured such that the liquid having filled the liquid chamber 55 can flow from the first chamber 55b to the second chamber 55c or in the opposite direction.

The diaphragm 30 includes a circular film body 31 made of an elastic member and a reinforcing fitting 36 provided on the outer circumference. The film body 31 has a thin portion 32 located on the outer circumferential side and folded a plurality of times in the thickness direction (vertical direction in FIG. 1), and a thick portion 33 located in the center and thicker than the thin portion 32.

In the center of the thick portion 33, a first protrusion 34 is formed protruding in the thickness direction (downward in FIG. 1) to be thicker. In the center of the first protrusion 34, a second protrusion 35 is formed further protruding in the thickness direction to be thicker. The diaphragm 30 is fixed by caulking to the opening 55a of the liquid chamber 55 via the reinforcing fitting 36. In the following description, a portion of the thick portion 33 which is located on the outer diameter sides of the first and second protrusions 34, 35 is referred to as an outer-circumferential-side thick portion 37.

The assembly process of the liquid-filled mount rubber 50 will be described with reference to FIGS. 2A to 2F. In a mount work placing step 41 shown in FIG. 2A, a mount work 50W in which the boss fitting 51 is vulcanized to the elastic base 53 is prepared, and the mount work 50W is placed on an assembly table 47 in such an orientation that the opening 55a of the liquid chamber 55 opens upward.

Figure 2A:
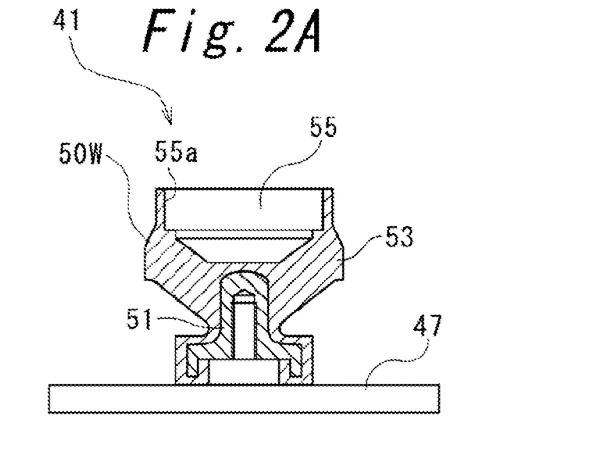
FIGS. 2A to 2F are explanatory views each showing an assembly process of the liquid-filled engine mount rubber.
Figure 2B:
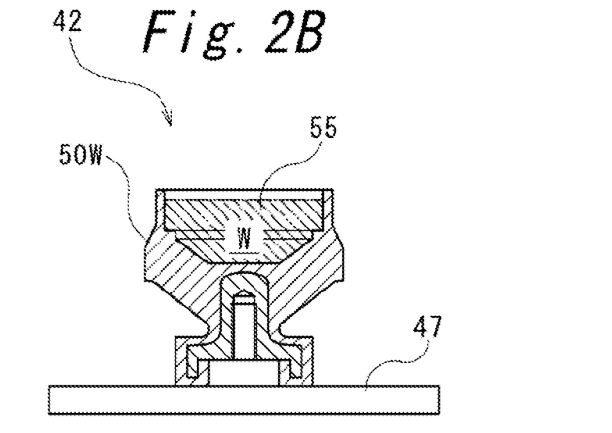
Figure 2C:
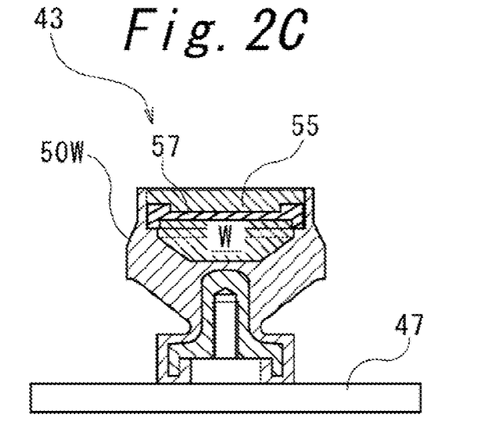
Figure 2D:
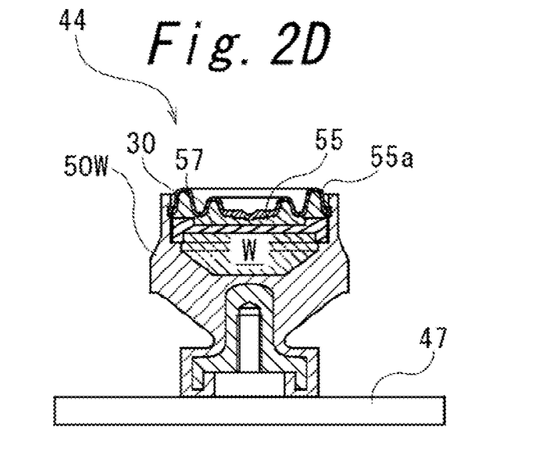

Next, in a liquid putting step 42 shown in FIG. 2B, a predetermined amount of a liquid W is put into the liquid chamber 55. Then, in a partition member assembling step 43 shown in FIG. 2C, the partition member 57 is assembled into the liquid chamber 55. Further, in a diaphragm assembling step 44 shown in FIG. 2D, the diaphragm 30 is assembled to the opening 55a of the liquid chamber 55.

Figure 2E:
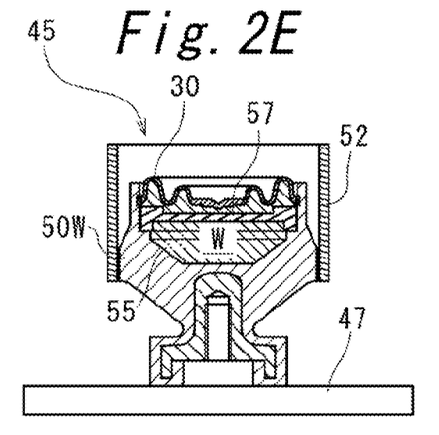
Figure 2F:
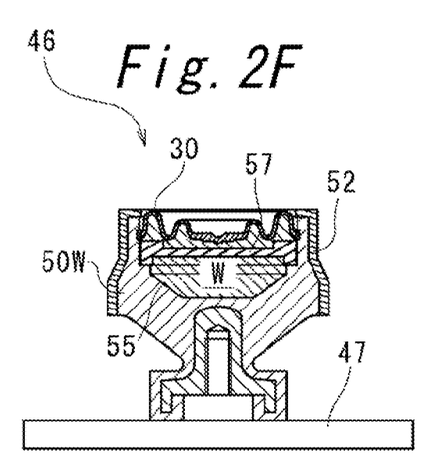

Next, in an outer cylindrical fitting assembling step 45 shown in FIG. 2E, the outer cylindrical fitting 52 is fit and inserted on the outer circumference of the upper end of the mount work 50W. Finally, in a liquid chamber sealing step 46 shown in FIG. 2F, the outer cylindrical fitting 52 is caulked radially inward to fix the diaphragm 30 to the opening 55a of the liquid chamber 55, so that the liquid chamber 55 is filled with the liquid W. Thereby, the liquid-filled mount, rubber 50 is manufactured.

Hereinafter, a description will be given of a diaphragm transfer device 1 that sucks and transfers the diaphragm 30 to the diaphragm assembling step 44.

Figure 3:
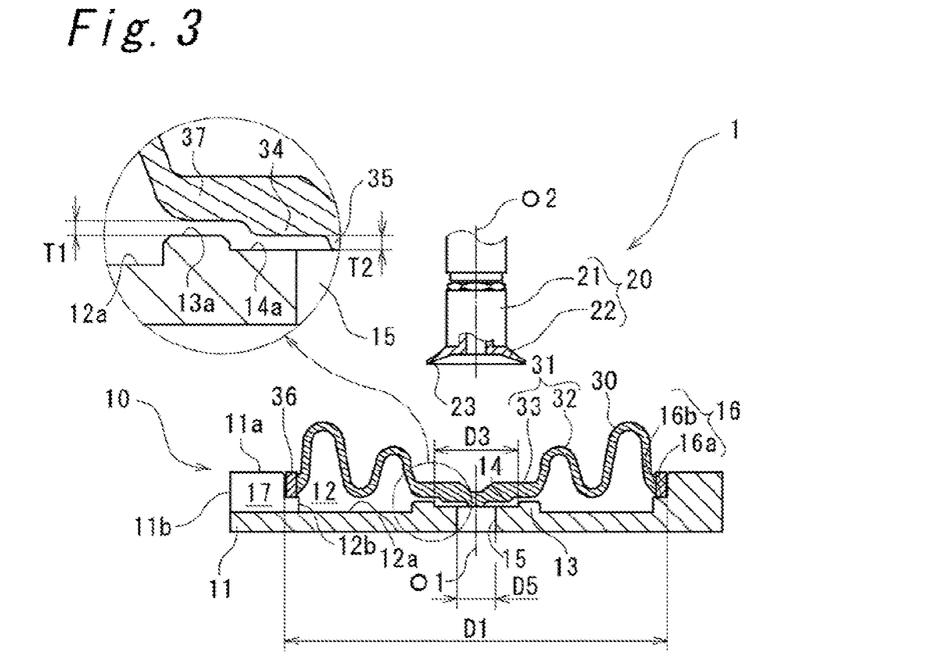
FIG. 3 is a sectional view showing a schematic configuration of a diaphragm transfer device.

FIG. 3 is a longitudinal sectional view showing a schematic configuration of the diaphragm transfer device 1, together with the diaphragm 30. As shown in FIG. 3, the diaphragm transfer device 1 includes a placing table 10 on which the diaphragm 30 is placed, and a suction unit 20 that sucks the diaphragm 30.

Figure 4:
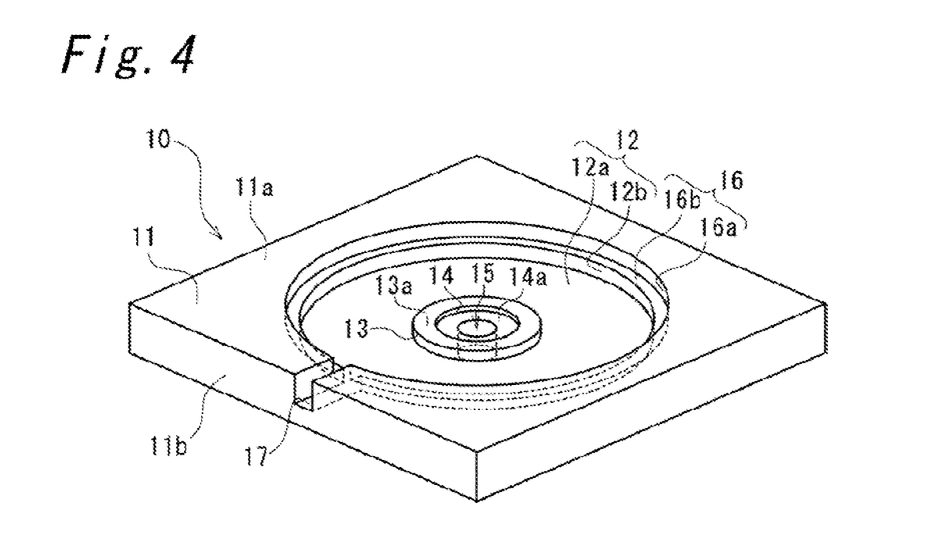
FIG. 4 is a perspective view of a placing table viewed from above.

FIG. 4 is a perspective view of the placing table 10 viewed from above. As shown in FIG. 4, the placing table 10 includes: a rectangular main body 11; a first recess 12 recessed downward from an upper surface 11a of the main body 11; an annular pedestal 13 projecting upward from a bottom surface 12a in the center of the first recess 12; a second recess 14 recessed downward from the top surface 13a in the center of the pedestal 13; and a through hole 15 vertically penetrating from a bottom surface 14a in the center of the second recess 14.

The first recess 12 includes a cylindrical outer circumferential wall 12b vertically extending on the outer circumference. Between the upper surface 11a of the main body 11 and the outer circumferential wall 12b of the first recess 12, an annular step 16 stepped down from the upper surface 11a is formed. In a top view, the first recess 12, the pedestal 13, the second recess 14, the through hole 15, and the step 16 are each formed concentrically around a center line O1 (cf. FIG. 3) of the diaphragm 30 placed on the placing table 10. The center line O1 of the diaphragm 30 means a straight line extending in the thickness direction (direction perpendicular to the surface) of the diaphragm 30 from the radial center position of the diaphragm 30 in a top view.

The step 16 includes a cylindrical outer circumferential wall 16a vertically extending on the outer circumference, and a bottom surface 16b extending radially inward from the lower end of the outer circumferential wall 16a to reach the first recess 12.

As shown in FIG. 3, an inner diameter D1 of the outer circumferential wall 16a is formed in a size allowing a little backlash (e.g., 1 mm) with respect to an outer diameter D2 of the diaphragm 30 (cf. FIG. 1) to such an extent as to enable radial positioning of the diaphragm 30.

While being placed on the placing table 10, the diaphragm 30 is radially positioned on the reinforcing fitting 36 by the outer circumferential wall 16a of the step 16 and is supported from below by the bottom surface 16b. In this state, the remaining portion of the diaphragm 30, that is, the film body 31 is spaced upward from the bottom surface 12a of the first recess 12.

The pedestal 13 and the second recess 14 are located corresponding to the respective portions of the diaphragm 30 placed on the placing table 10. Specifically, with respect to the diaphragm 30 placed on the placing table 10, the pedestal 13 faces the outer-circumferential-side thick portion 37 from below via a first gap T1, and the second recess 14 faces the first protrusion 34 from below via a second gap T2. An inner diameter D3 of the second recess 14 is larger than an outer diameter D4 of the first protrusion 34 (cf. FIG. 1). In other words, the whole first protrusion 34 is located inside the second recess 14 in a top view.

In the present embodiment, the first gap T1 is set to the same length as the second gap T2. The first and second gaps T1, T2 are set to such a length as to hold non-contact with the diaphragm 30 placed on the placing table 10 even when manufacturing variations in shape of the diaphragm 30 and variations in placement positions are taken into consideration. In the present embodiment, the first, gap T1 and the second gap T2 are set to 1 mm.

The through hole 15 is located just below the second protrusion 35 of the diaphragm 30. An inner diameter D5 of the through hole 15 is larger than an outer diameter D6 (cf. FIG. 1) of the second protrusion 35.

In the present embodiment, a top surface 13a of the pedestal 13 and a bottom surface 14a of the second recess 14 are located above the bottom surface 12a of the first recess 12 and below the bottom surface 16b of the step 16.

As shown in FIG. 4, the placing table 10 is further formed with a groove 17 that communicates a side surface 11b of the main body 11 and the first recess 12. Referring also to FIG. 3, the groove bottom of the groove 17 is located below the bottom surface 16b of the step 16, and specifically, the bottom surface 16b is located at the same height as the bottom surface 12a of the first recess 12. Thereby, with the diaphragm 30 placed on the placing table 10, a space defined between the diaphragm 30 and the placing table 10 below the diaphragm 30 communicates with the outside of the space through the groove 17.

As shown in FIG. 3, the suction unit 20 includes a suction rod 21 and a suction pad 22 attached to the lower end of the suction pad 22. A negative pressure source (not shown) is connected to the base end of the suction rod 21, and the suction pad 22 is configured to be in a negative pressure state on the inside. The suction pad 22 is a hollow rubber member, is formed in a conical shape radially extending downward, and has a suction surface 23 formed at the inner lower end. In the suction pad 22, the suction surface 23 fits along an object to be sucked to bring the inside of the suction pad 22 into a substantially sealed state, to suck the object to be sucked with negative pressure.

The suction unit 20 is configured to be movable in the up and down, right and left, and front and rear directions by a moving means (not shown) (e.g., robot). The suction unit 20 descends and accesses the diaphragm 30 from an access start position located above the diaphragm 30 with an axis O2 aligned with a center line O1 of the diaphragm 30. At the access start position, the suction surface 23 of the suction pad 22 is located so as to be just above the outer-circumferential-side thick portion 37 of the diaphragm 30.

The operation during suction of the diaphragm 30 by the suction unit 20 will be described.

Figure 5:
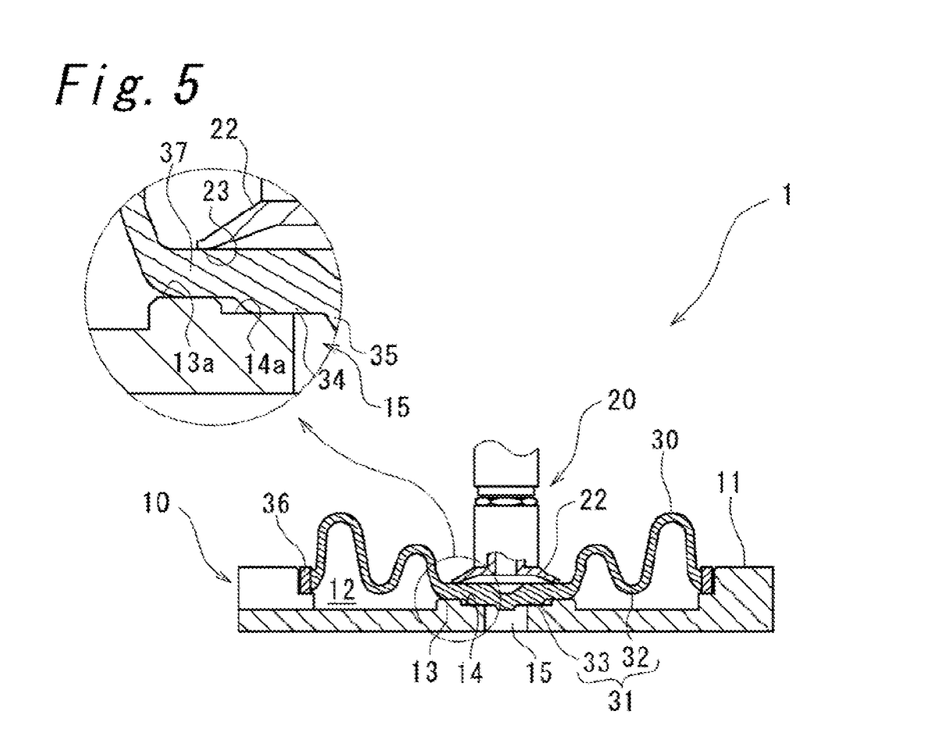
FIG. 5 is a cross-sectional view showing a state in which a diaphragm is sucked by a suction pad.

As shown in FIG. 5, the suction unit 20 descends from the access start position, and the diaphragm 30 is sucked at the outer-circumferential-side thick portion 37 by the suction pad 22 provided at a lower-end of the suction unit 20. That is, the outer-circumferential-side thick portion 37 constitutes the sucked portion. At this time, the suction surface 23 of the suction pad 22 contacts the outer-circumferential-side thick portion 37 from above and presses the outer-circumferential-side thick portion 37 downward. When pushed downward, the outer-circumferential-side thick portion 37 is seated on the top surface 13a of the pedestal 13 and supported by the pedestal 13 from below. In other words, the pedestal 13 is located facing the lower surface of the suction surface 23 of the suction pad 22 with the outer-circumferential-side thick portion 37 interposed therebetween.

At this time, in the diaphragm 30, as the outer-circumferential-side thick portion 37 is lowered, the whole thick portion 33, that is, the first and second protrusions 34, 35 is also lowered. Here, the second recess 14 is positioned below the first protrusion 34. The second recess 14 has a larger diameter than the first protrusion 34, and the second gap T2 between the second recess 14 and the first protrusion 34 is the same as the first gap T1. Further, the through hole 15 is located below the second protrusion 35. The through hole 15 has a larger diameter than the second protrusion 35.

Therefore, even when the first and second protrusions 34, 35 are lowered together with the outer-circumferential-side thick portion 37, the first and second protrusions 34, 35 are put into the second recess 14 and the through hole 15, respectively. Therefore, the first and second protrusions 34, 35 are prevented from contacting the placing table 10 before the outer-circumferential-side thick portion 37 contacts the pedestal 13.

As a result, the outer-circumferential-side thick portion 37 can be seated on the pedestal 13 while being reduced in downward inclination and kept substantially horizontal, so that the suction surface 23 of the suction pad 22 can be easily fit along the outer-circumferential-side thick portion 37. Further, the outer-circumferential-side thick portion 37 is supported from below by the pedestal 13. This makes it easy to keep the inside of the suction pad 22 in a substantially sealed state and enables the suction pad 22 to suitably suck the diaphragm 30. The diaphragm 30 sucked by the suction unit 20 is transferred to the diaphragm assembling step 44 and assembled to the opening 55a of the liquid chamber 55 in the mount work SOW.

According to the diaphragm transfer device 1 described above, such effects as follows can be obtained.

(1) Even when the diaphragm 30 is pressed downward by the suction pad 22 during suction, since the first protrusion 34 is located inside the second recess 14, the first protrusion 34 is prevented from contacting the placing table 10 before the outer-circumferential-side thick portion 37 is seated on the pedestal 13. This leads to reduction in downward deformation of the diaphragm 30 in an inclined manner at the outer-circumferential-side thick portion 37 on the outer circumferential side of the first protrusion 34 during suction. As a result, the suction surface 23 of the suction pad 22 easily fits along the outer-circumferential-side thick portion 37 as the sucked portion of the diaphragm 30, and the property of sucking the diaphragm 30 is improved.

(2) In a state where the diaphragm 30 is placed on the placing table 10 and not sucked by the suction pad 22, the outer-circumferential-side thick portion 37 faces the pedestal 13 via the first gap T1. Thereby, in the state where the diaphragm 30 is placed on the placing table 10, interference with the pedestal 13 is prevented even when the dimensional variations of the diaphragm 30 are taken into consideration. This reduces the deformation of the diaphragm 30 during placement, thus improving the property of sucking the diaphragm 30 by the suction pad 22.

(3) In the state where the diaphragm 30 is placed on the placing table 10 and not sucked by the suction pad 22, the first protrusion 34 faces the second recess 14 via the second gap T2. Thereby, when the outer-circumferential-side thick portion 37 of the diaphragm 30 is pressed downward by the suction pad 22 during suction, the outer-circumferential-side thick portion 37 is seated on the pedestal 13 before the first protrusion 34 contacts the bottom surface 14a of the second recess 14. This reduces the deformation of the outer-circumferential-side thick portion 37 as the sucked portion during suction, thus improving the property of sucking the diaphragm 30 by the suction pad 22.

(4) The diaphragm 30 is radially positioned at the reinforcing fitting 36 of the outer circumference by the step 16 of the placing table 10 and is also supported from below. Thereby, the diaphragm 30 can be placed on the placing table 10 while being prevented from contacting the pedestal 13, so that the deformation of the diaphragm 30 during placement is reduced. This improves the property of sucking the diaphragm 30 by the suction pad 22.

(5) In the state where the diaphragm 30 is placed on the placing table 10, a space defined between the diaphragm 30 and the placing table 10 below the diaphragm 30 communicates with the outside of the space through the groove 17. This prevents formation of a substantially sealed space between the diaphragm 30 placed on the placing table 10 and the placing table 10, so that the diaphragm 30 can be easily lifted from the placing table 10, and the property of sucking the diaphragm 30 by the suction pad 22 is improved.

In the above embodiment, the first and second gaps T1, T2 are set to the same length, but the present invention is not limited thereto. That is, during suction, before the outer-circumferential-side thick portion 37 is seated on the pedestal 13, the first protrusion 34 may not only be seated on the bottom surface 14a of the second recess 14, and the first gap T1 may not only be longer than the second gap T2.

Note that the present invention is not limited to the structure described in the above embodiment, but various changes can be made.

What is claimed is:

1. A diaphragm transfer device for sucking and transferring a diaphragm that includes a protrusion protruding in a direction perpendicular to a surface of the diaphragm, the diaphragm transfer device comprising:
   a placing table on which a diaphragm is placed in such an orientation that the protrusion faces downward; and
   a suction pad that sucks the diaphragm placed on the placing table, from above on an outer circumferential side of the protrusion,
   wherein
   the placing table includes
   a pedestal having an annular shape and facing a sucked portion of the diaphragm from below, the sucked portion being sucked by the suction pad, and
   a recess recessed downward on an inner diameter side of the pedestal, and
   a whole of the protrusion of the diaphragm is located inside the recess in a top view.

2. The diaphragm transfer device according to claim 1, wherein in a state where the diaphragm is placed on the placing table and not sucked by the suction pad, the diaphragm vertically faces the pedestal via a first gap.

3. The diaphragm transfer device according to claim 2, wherein
   in the state where the diaphragm is placed on the placing table and not sucked by the suction pad, the protrusion vertically faces the recess via a second gap, and
   a length of the first gap is equal to or less than a length of the second gap.

4. The diaphragm transfer device according to claim 1, wherein
   the placing table further includes a step having an annular shape and
   the step has:
   an outer circumferential wall that positions an outer circumference of the diaphragm radially from an outer diameter side; and
   a bottom surface that supports the outer circumference of the diaphragm from below.

5. The diaphragm transfer device according to claim 4, wherein
   the placing table is formed with a groove that radially penetrates the step, and
   in a state where the diaphragm is positioned on the placing table, a space defined between the diaphragm and the placing table below the diaphragm communicates with an outside of the space through the groove.

* * * * *